P. NEFF, D. COLE, & E. L. EBERSOLE.
CHECK VALVE FOR AMMONIA COMPRESSORS.
APPLICATION FILED SEPT. 25, 1908.
967,546. Patented Aug. 16, 1910.
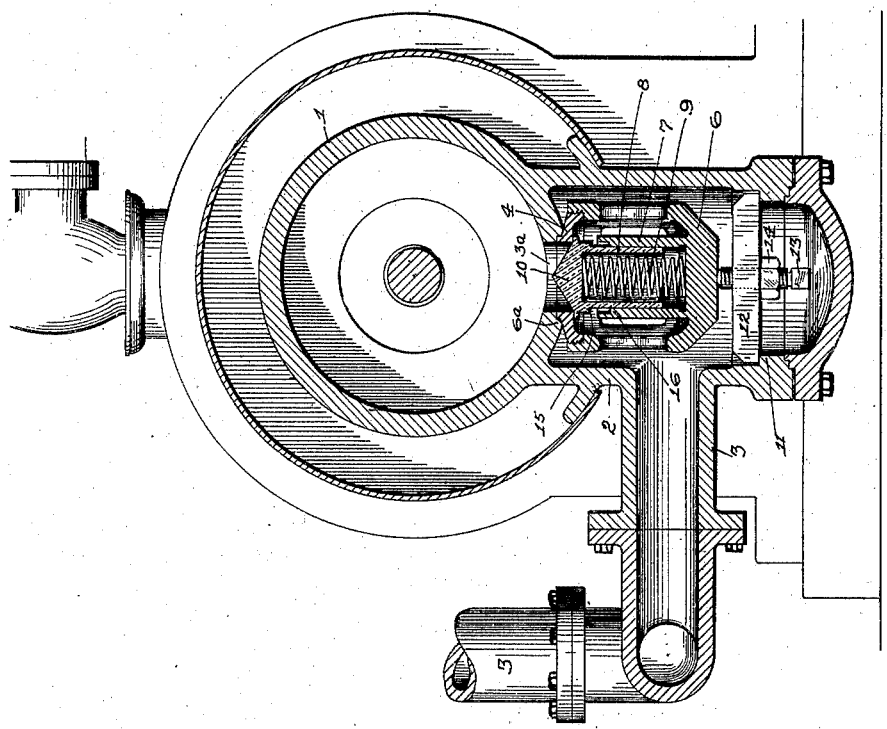
Witnesses
Harry O. Rastetter
Sylvia Boron
Inventors
Peter Neff
Donald Cole
Elbert L. Ebersole
By Bond + Miller Attorneys

UNITED STATES PATENT OFFICE.

PETER NEFF, DONALD COLE, AND ELBERT L. EBERSOLE, OF CANTON, OHIO, ASSIGNORS TO THE ARCTIC ICE MACHINE COMPANY, OF CANTON, OHIO, A CORPORATION OF OHIO.

CHECK-VALVE FOR AMMONIA-COMPRESSORS.

967,546.  Specification of Letters Patent.  Patented Aug. 16, 1910.

Application filed September 25, 1908. Serial No. 454,742.

*To all whom it may concern:*

Be it known that we, PETER NEFF, DONALD COLE, and ELBERT L. EBERSOLE, residents of Canton, in the county of Stark and State of Ohio, have invented certain new and useful Improvements in Check-Valves for Ammonia-Compressors; and we do hereby declare the following to be a full, clear, and exact description of the invention.

Our invention relates to an improved check-valve for ammonia compressors, the object of which is to so tension the movable parts of the valve that a certain amount of pressure must come upon the valve before the same is opened, and to automatically close the valve when pressure is removed or equalized.

With these objects and others in view the invention consists in certain novel features of construction and arrangement of the parts which will be more fully described and pointed out in the claims.

In the accompanying drawing: Figure 1 are views showing the different parts of the valve detached and separated from the valve housings or casings. Fig. 2 is a vertical section of the valve and a transverse section of the cylinder.

Similar numerals of reference indicate corresponding parts in all the figures of the drawing.

In the accompanying drawing, 1 represents the cylinder, which within itself forms no specific part of the present invention, except that a cylinder and piston and piston rod must be used to carry out the objects and purposes of the valve proper. The cylinder 1 is provided with the casing or housing 2, from which leads the conveyer pipe 3, which conveyer pipe is extended to the condenser in the usual manner. The cylinder 1 is provided with the opening or passage 3ª, in which opening or passage is located the fixed valve seat ring 4, said valve seat ring being held in proper fixed relative position with reference to the cylinder 1 by means of the annular flange 5 and the annular shoulder 6ª, whereby the valve ring 4 is properly and accurately seated. Below the valve ring 4 is located the cage 6, which cage is provided with the integral hollow sleeve or thimble 7, which is formed of a diameter less than the diameter of the cage 6. Within the hollow thimble 7 is telescopically located the hollow valve stem 8, in which hollow valve stem is located the helical spring 9, the ends of said spring abutting against the bottom of the thimble 7 and the bottom or underside of the conical valve head 10. The bottom or lower portion of the casing or housing 2 is provided with the shoulder 11, which shoulder is for the purpose of holding the cross-bar 12, through which cross-bar is located the screw 13, which screw is for the purpose of supporting the cage 6.

For the purpose of preventing any accidental displacement of the cage 6 after it has been properly connected together with the valve ring 4, the jam-nut 14 is provided. For the purpose of removing the valve ring 4 with the cage 6 for any purpose, the outer periphery of the valve ring is screw threaded and the inner periphery of the cage 6 at its upper end is also screw threaded by means of which the valve ring 4 and the cage 6 are connected together in such a manner that when the cage is removed the valve ring will not become detached from the cage.

It will be understood that by telescopically connecting the valve stem 8 and the thimble 7 together, the valve head and its hollow stem is free to move away or downward from the valve seat ring 4, thereby opening the valve and permitting the gas to pass through the cage and into the conveyer pipe 3.

For the purpose of cushioning the downward stroke of the valve head proper, said valve head is provided with the enlarged annular flange 15, which flange enters the top or upper end of the hollow thimble 7 located above the annular shoulder 16, whereby a cushion movement is produced by reason of the gas located between the bottom of the annular flange 15 and the shoulder 16 and necessarily to be forced out as the valve head descends, but it will be understood that after the flange 15 has entered the top or upper end of the hollow thimble 7 its escape is retarded to a certain extent by means of the contact as between the top or upper end of the hollow thimble and the periphery of the flange 15, but the adjustment as between these parts should be such that a gradual escaping of the gas is permitted. After the pressure of gas has been removed from the valve-head 10 the spring 9 will automatically close the valve and cut off any backward pressure.

It will be understood that the tension of the spring 9 should be such that the spring must be compressed to open the valve and hence thereby utilizing the stored energy of the spring in addition to the back pressure of the gas.

Having fully described our invention, what we claim as new and desire to secure by Letters Patent, is—

1. In a check valve for ammonia compressors, the combination of a cylinder, a passage formed through said cylinder, a casing surrounding the passage, a fixed valve seat-ring, a cage provided with an integral hollow thimble formed of a diameter less than the diameter of the cage, a hollow valve stem provided with a conical valve head, said hollow thimble and hollow valve stem telescopically connected together, a spring adapted to abut against the bottom of the thimble and the underside of the valve head, a cross bar carried by the casing or housing, said cross bar provided with a screw threaded bolt adapted to support the cage, substantially as and for the purpose specified.

2. In a check valve for ammonia compressors, the combination of a cylinder, a passage formed through said cylinder, a casing surrounding the passage, a fixed valve seat-ring, a cage provided with an integral hollow thimble formed of a diameter less than the diameter of the cage, a hollow valve stem provided with a valve head, said hollow thimble and hollow valve stem telescopically connected together, a spring adapted to abut against the bottom of the thimble and the underside of the valve head, a cross bar carried by the casing or housing, said cross bar provided with a screw threaded bolt adapted to support the cage, substantially as and for the purpose specified.

In testimony that we claim the above, we have hereunto subscribed our names in the presence of two witnesses.

PETER NEFF.
DONALD COLE.
ELBERT L. EBERSOLE.

Witnesses:
GORDON M. MATHER,
EDWARD WILLIAMS.